(No Model.)

J. T. PETERS & G. E. WARD.
NUT LOCK.

No. 547,678.    Patented Oct. 8, 1895.

Witnesses:
J. L. Ourand
W. L. Coombs

Inventors
James T. Peters, George E. Ward
by James Dagger &c.
Attorneys

UNITED STATES PATENT OFFICE.

JAMES T. PETERS AND GEORGE E. WARD, OF ARMSTRONG, WEST VIRGINIA.

NUT-LOCK.

SPECIFICATION forming part of Letters Patent No. 547,678, dated October 8, 1895.

Application filed June 20, 1895. Serial No. 553,448. (No model.)

*To all whom it may concern:*

Be it known that we, JAMES T. PETERS and GEORGE E. WARD, citizens of the United States, and residents of Armstrong, in the county of Fayette and State of West Virginia, have invented certain new and useful Improvements in Nut-Locks; and we do hereby declare that the following is a full, clear, and exact description of the invention, which will enable others skilled in the art to which it appertains to make and use the same, reference being had to the accompanying drawings, which form a part of this specification.

Our invention relates to improvements in nut-locks principally designed for use in connecting railroad-rails together, although it may be employed for connecting different objects or parts of machines with each other generally, especially if the said parts are subject to vibration, which has a tendency to loosen the nuts.

The object of the invention is to provide an improved nut-lock which shall be simple and economical in construction, and which will prevent any loosening or backward movement of the nuts when in use, but which can readily be detached when it is desired to remove the nuts.

The invention consists in the novel construction and combination of parts hereinafter fully described and claimed.

Figure 1:
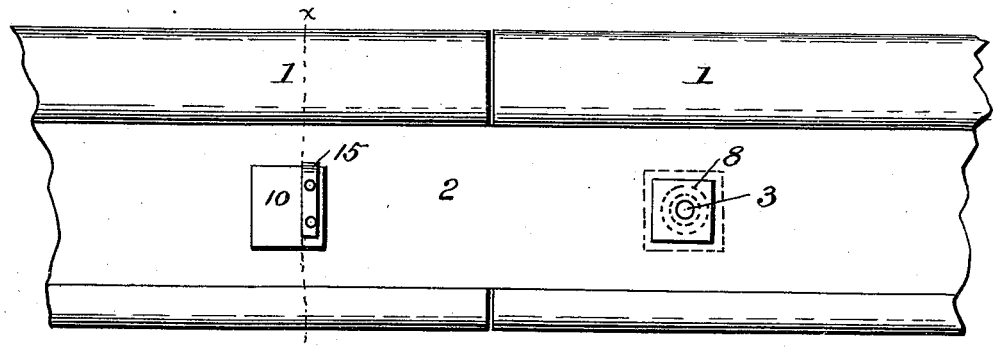
Figure 2:
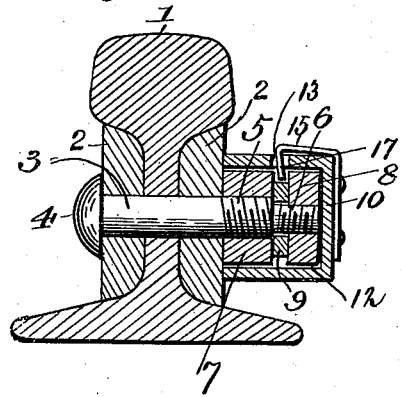
Figure 3:
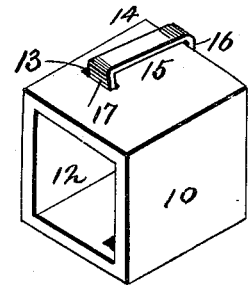
Figure 4:
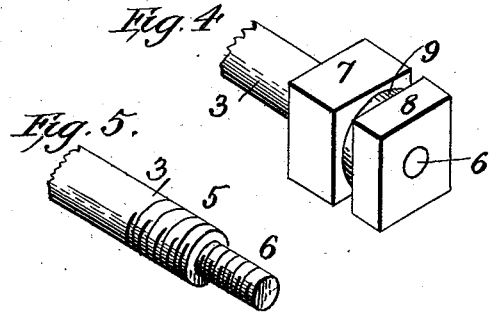
Figure 5:
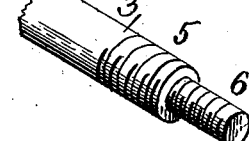
Figure 6:
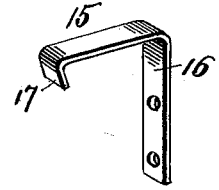

In the accompanying drawings, Figure 1 is an elevation showing two railroad-rails with our improved nut-lock applied thereto, the box of one of the nuts being removed. Fig. 2 is a transverse sectional view on the line $x$ $x$, Fig. 1. Fig. 3 is a perspective view of the box detached. Fig. 4 is a perspective view of one end of the bolt, showing the nuts and washer, the box being removed. Fig. 5 is a similar view, the nuts and washer being removed. Fig. 6 is a perspective view of the key.

In the said drawings, the reference-numeral 1 designates two railroad-rails, 2 the fish-plate, and 3 the bolts passing therethrough and formed with heads 4. At the opposite end the bolt is formed with right and left hand screw-threads 5 and 6.

The numerals 7 and 8 designate right and left hand threaded nuts, which engage, respectively, with the screw-threads on the bolt. These nuts are shown as being square, but they may be hexagonal, octagonal, or of any other angular shape desired.

The numeral 9 designates a circular washer interposed between the two nuts. This washer is of smaller area than the nuts, so that when the box hereinafter described is placed over the nuts there will be space formed therebetween to receive the end of a bent retaining-spring.

The numeral 10 designates a box having upon its inner face an angular recess 12, corresponding in shape and size with the nuts and provided with an aperture 13 for the insertion of a key 14. This key consists of a spring-metal strip bent over at a right angle, forming arms 15 and 16, one of which is secured to the box, while the extremity of the other is bent inwardly, forming a catch 17, which passes through the aperture 13. The box in the present instance is shown as being provided with but one aperture 13, but it may be formed with a similar aperture opposite the same and the key passed through both of these apertures, if desired. When the nuts and washers are applied to the bolt and the box applied, the catch 17 will engage between the nuts, so that it will be impossible to turn the same backward. The box being made solid at its outer end protects the nuts and washer from inclemencies of the weather.

Having thus fully described our invention, what we claim is—

In a nut-lock, the combination with the bolt having right and left screw-threads at one end, of the right and left threaded nuts engaging therewith, the circular washer of smaller area interposed between said nuts, the box closed at its outer end, and its inner end formed with an angular recess and said box formed with an aperture in one side intersecting said recess, and the key consisting of the strip of spring metal bent over upon itself forming two arms, one of which is secured to the box and the other arm having its end bent inwardly and passed through the aperture in the box and engaging in the space between said nuts; substantially as described.

In testimony that we claim the foregoing as our own we have hereunto affixed our signatures in presence of two witnesses.

JAMES T. PETERS.
GEORGE E. WARD.

Witnesses:
HENRY C. WRISTON,
WILLIAM C. PETERS.